US011521207B2

(12) United States Patent
Braundmeier (10) Patent No.: US 11,521,207 B2
(45) Date of Patent: Dec. 6, 2022

(54) TOKENIZATION REQUEST HANDLING AT A THROTTLED RATE IN A PAYMENT NETWORK

(71) Applicant: MASTERCARD INTERNATIONAL INCORPORATED, Purchase, NY (US)

(72) Inventor: Aaron Braundmeier, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 344 days.

(21) Appl. No.: 16/395,788

(22) Filed: Apr. 26, 2019

(65) Prior Publication Data
US 2020/0342453 A1 Oct. 29, 2020

(51) Int. Cl.
*G06Q 20/38* (2012.01)
*G06Q 20/16* (2012.01)
*H04L 67/60* (2022.01)

(52) U.S. Cl.
CPC .......... *G06Q 20/385* (2013.01); *G06Q 20/16* (2013.01); *H04L 67/60* (2022.05)

(58) Field of Classification Search
CPC ...... G06Q 20/12; G06Q 20/26; G06Q 20/341; G06Q 20/352
See application file for complete search history.

(56) References Cited

U.S. PATENT DOCUMENTS

| | | | |
|---|---|---|---|
| 9,317,848 B2* | 4/2016 | Hammad | G06Q 20/42 |
| 2012/0039469 A1* | 2/2012 | Mueller | G06Q 20/12 |
| | | | 380/252 |
| 2014/0074637 A1* | 3/2014 | Hammad | G06Q 20/352 |
| | | | 705/21 |

(Continued)

FOREIGN PATENT DOCUMENTS

JP 2019106212 * 6/2019

OTHER PUBLICATIONS

Controlling Security Risk and Fraud in Payment Systems by Richard J. Sullivan, Kansas City Federal Reserve (Year: 2014).*

(Continued)

*Primary Examiner* — Richard C Weisberger (57) ABSTRACT

The disclosure herein describes handling tokenization requests associated with electronic transactions at a payment network at a throttled processing rate. Tokenization requests are received by tokenization stream brokers from request sources. The tokenization requests include primary account numbers (PANs) to be tokenized. The tokenization requests are then consumed from the tokenization stream brokers, at a request storage rate, for storage in a request data store. Tokenization operations are then performed, at a request processing rate, based on the tokenization requests stored in the request data store. The tokenization operations include providing at least the primary account numbers to be tokenized to issuers associated with the tokenization requests at issuer tokenization rates associated with the issuers, whereby the request processing rate is throttled for compatibility with capabilities of the system and the issuers without unnecessary limitations placed on request sources.

20 Claims, 5 Drawing Sheets

(56) References Cited

U.S. PATENT DOCUMENTS

| | | |
|---|---|---|
| 2016/0315865 A1 | 10/2016 | Kalkunte et al. |
| 2018/0181964 A1 | 6/2018 | Zagarese et al. |
| 2018/0285864 A1* | 10/2018 | Dill .................. G06Q 20/40 |
| 2019/0385159 A1* | 12/2019 | Beatty ................ G06Q 20/32 |

OTHER PUBLICATIONS

Lysenko, N., "International Search Report", International Application No. PCT/US2020/023067, dated Jun. 11, 2020, 2 pages.

Lysenko, N., "Written Opinion of the International Searching Authority", International Application No. PCT/US2020/023067, dated Jun. 11, 2020, 5 pages.

\* cited by examiner

TOKENIZATION REQUEST HANDLING AT A THROTTLED RATE IN A PAYMENT NETWORK

BACKGROUND

With the increasing ubiquity of online merchants and other types of electronic transactions, the need for secure, efficient tokenization has grown substantially. Tokenization provides merchants or other parties to transactions with tokens that can be used to initiate a transaction with a customer's account without exposing the customer's vulnerable account information to identity theft or other types of fraud. Major merchants that perform substantial quantities of electronic transactions may request the generation millions of tokens from token generation entities, such as payment networks, placing a significant processing load on the payment networks and other parties, such as issuers associated with the account information being tokenized. While it is not ideal, payment networks may be forced to substantially limit the number of tokenization requests that they accept from such merchants at a time, which introduces additional complexity into the systems of the merchants and the payment network and negatively affects the rate at which the tokenization requests can be processed. Further limitations in the rate of handling the requests may also be necessary based on the capabilities or limitations of the issuers associated with the tokenization requests.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for handling tokenization requests associated with electronic transactions at a payment network at a throttled processing rate is described. Tokenization requests are received by one or more tokenization stream brokers in a request stream layer via tokenization request input interfaces from one or more request sources. The tokenization requests include primary account numbers (PANs) to be tokenized. The tokenization requests are then consumed by a request handler from the one or more tokenization stream brokers via request consumer interfaces, at a request storage rate, for storage in a request data store. Tokenization operations are then performed by a request processing service, at a request processing rate, based on the tokenization requests stored in the request data store. The tokenization operations include providing at least the PANs to be tokenized to one or more issuers associated with the tokenization requests at issuer tokenization rates associated with the one or more issuers, whereby the request processing rate is throttled for compatibility with capabilities of the system and the one or more issuers.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Aspects of the disclosure provide a computerized method and system for handling tokenization requests associated with electronic transactions at a payment network at a throttled processing rate. Tokenization requests are received by tokenization stream brokers in a request stream layer via tokenization request input interfaces from request sources, such as online merchants. The tokenization requests include primary account numbers (PANs) to be tokenized. The tokenization requests are then consumed by a request handler from the tokenization stream brokers via request consumer interfaces, at a request storage rate, for storage in a request data store. Tokenization operations are then performed by a request processing service, at a request processing rate, based on the tokenization requests stored in the request data store. The tokenization operations include providing at least the PANs to be tokenized to the issuers associated with the tokenization requests at issuer tokenization rates associated with the issuers, whereby the request processing rate is throttled for compatibility with capabilities of the system and the one or more issuers. Once the tokenization processing is complete, generated tokens are provided back to the request sources using the tokenization stream brokers.

The disclosure operates in an unconventional way by buffering received tokenization requests and then managing their consumption and processing at defined or dynamic rates to enhance the efficiency of the use of processing resources of the system. The buffers provided by the stream brokers can be leveraged to accept large batches of tokenization requests from request sources and to provide the request processing service or other processing resources with enough requests to ensure an efficient processing rate without becoming overloaded. Additionally, transfer of tokenization request information to issuers can also be throttled based on the specific issuer's capabilities or desires. The use of the described system simplifies the requirements for request sources to provide tokenization requests and also simplifies the demands on issuers throughout the tokenization process. The described system may also reduce the number of necessary manual interactions from users with the system, as the throttling of rates of storage, processing, and/or sending to the issuers may be automated and the artificial limitations on the number of tokenization requests that may be received by the system are eliminated.

Further, the use of the described stream layer and associated categories enhance the security of the tokens after generation by automatically limiting access to the tokens to the source that sent the associated tokenization request. The categories can be leveraged to prioritize or otherwise organize the order in which tokenization processing happens on the requests, thereby enhancing the flexibility and efficiency of tokenization processing in the system.

Figure 1:
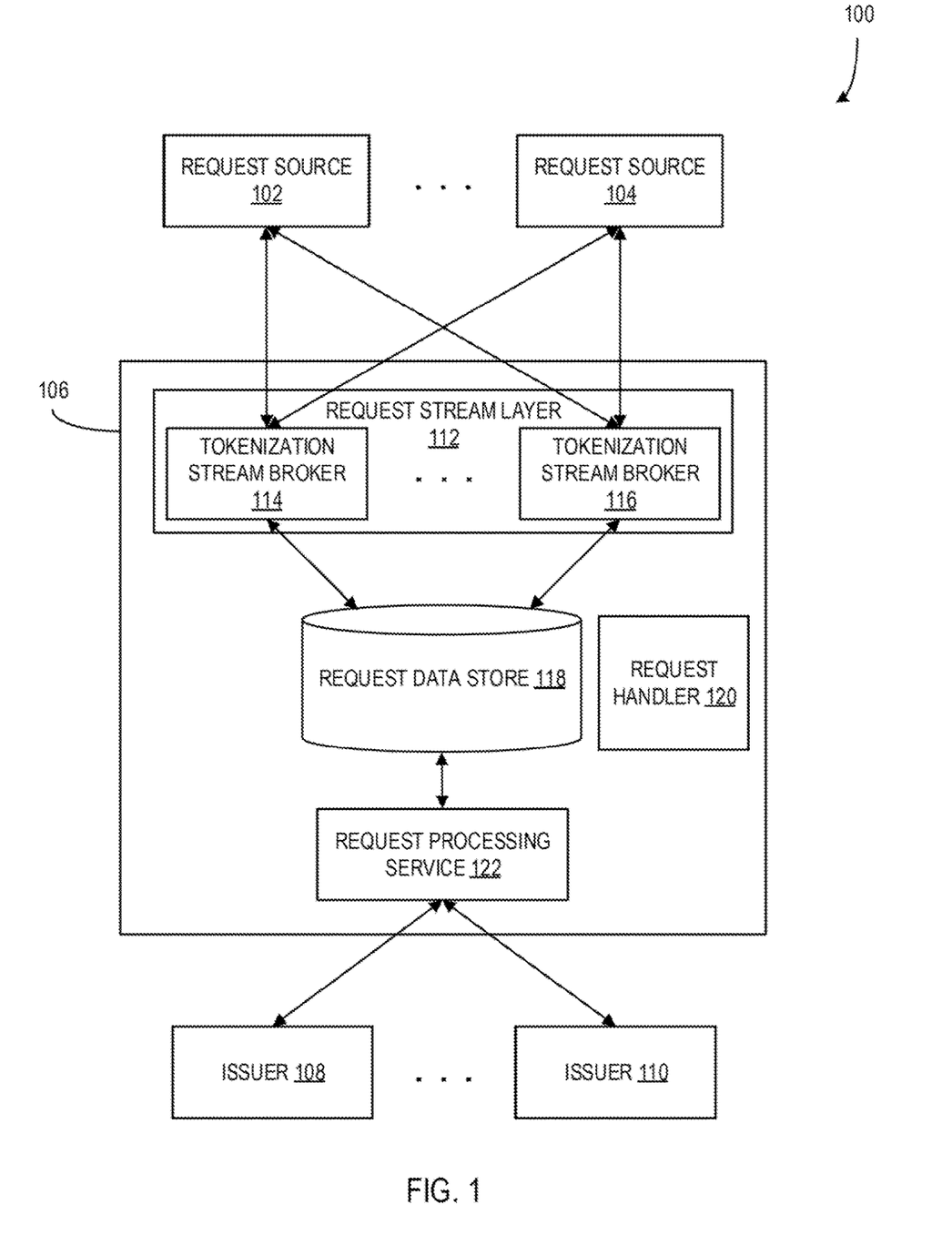
FIG. 1 is an exemplary block diagram illustrating a system configured for handling tokenization requests at a payment network at a throttled rate according to an embodiment.

FIG. 1 is an exemplary block diagram illustrating a system 100 configured for handling tokenization requests at a payment network 106 at a throttled rate according to an embodiment. The system 100 includes request sources 102 and 104 that send tokenization requests to the payment network 106. The payment network 106 processes the tokenization requests and communicates with issuers 108 and 110 associated with the tokenization requests to complete the requested tokenization activities. In most examples, the result of a tokenization request from a request source 102 or 104 is the payment network 106 responding with a token associated with the tokenization request which can then be used to securely complete a transaction or transactions, as is understood by a person of ordinary skill in the art.

In most examples, the request sources 102-104 are merchants, companies, or other entities that accepted payment information, such as primary account numbers (PANs), from customers in the course of arranging transactions. For instance, request source 102 may be an online retail merchant that receives payment information from thousands of customers every day. It should be understood that, while only two request sources are illustrated, the system 100 may include more, fewer, or different request sources without departing from the description.

To securely enable electronic payment transactions, the request sources 102-104 send tokenization requests to the payment network 106. The request sources 102-104 may be required to or otherwise desire to obtain and use secure tokens in place of customers' vulnerable account information, such as PANs, for initiating transactions, storing customer information, or the like. The payment network 106 is configured to receive and handle the tokenization requests and respond to the request sources 102-104 with tokens associated with the tokenization requests. Further, the payment network 106 is configured to perform other transaction processing operations to facilitate the completion of such transactions in conjunction with merchants, acquirers, and/or issuers as would be understood by a person of ordinary skill in the art.

The payment network 106 includes a request stream layer 112 that comprises tokenization stream brokers 114-116 (e.g., an Apache Kafka layer), a request data store 118, a request handler 120, and a request processing service 122. The request stream layer 112 and associated tokenization stream brokers 114-116 include software, firmware, and/or hardware configured to receive the tokenization requests from the request sources 102-104 and provide the tokenization requests to the request data store 118 for storage therein. The request stream layer 112 is configured to buffer, queue, or otherwise store the tokenization requests in a data stream format or arrangement in the tokenization stream brokers 114-116. The tokenization stream brokers 114-116 include producer interfaces, or input interfaces, that are exposed to the request sources 102-104 and/or other entities that may make use of the tokenization service provided by the payment network 106. Tokenization requests received via the producer interfaces of the brokers 114-116 are queued in the broker in the chronological order in which they are received. The tokenization stream brokers 114-116 further expose consumer interfaces, or output interfaces, that are exposed to the request data store 118, the request handler 120, and/or other components of the payment network 106.

The consumer interfaces of the brokers 114-116 may be accessed by the request data store 118 and/or the request handler 120 to obtain the queued tokenization requests from the brokers 114-116 in the order in which they are stored.

It should be understood that, while only two tokenization stream brokers 114-116 are illustrated, the system 100 may include more, fewer, or different tokenization stream brokers without departing from the description herein. The request stream layer 112 may be configured to instantiate and/or manage a plurality of tokenization stream brokers 114-116 to provide consistent performance and reliability to the request sources 102-104 (e.g., the request stream layer 112 may instantiate and/or execute hundreds of tokenization stream brokers 114-116 to enhance the capability of the payment network 106 to receive large quantities of tokenization requests from many different request sources 102-104). Further, the tokenization stream brokers 114-116 may be configured to provide redundant buffering of received tokenization requests to guard against the failure of a single tokenization stream broker. For instance, each tokenization request received from a request source 102 may be buffered by a primary tokenization stream broker and then copied to one or more backup tokenization stream brokers. Then, if the primary tokenization stream broker fails or is otherwise unavailable, one of the backup tokenization stream brokers may assume the primary role to respond to requests for the stored tokenization requests or otherwise provide request information to the request data store 118 or other components of the payment network 106.

In some examples, the tokenization stream brokers 114-116 are configured to queue or buffer the tokenization requests in association with request categories, topics, types, or other request organizations. For instance, the tokenization stream brokers 114-116 may be configured to associate each received tokenization request with a category associated with the request source from which the tokenization request was received. Additionally, or alternatively, the stream brokers 114-116 may organize the tokenization requests according to other categories, such as specific issuer categories, request type or associated transaction type categories, request priority categories, or the like. Such categories may be used by other components of the system 100 (e.g., the request processing service 122) when determining when and/or how to process the requests. For instance, a set of tokenization requests in a high priority category may be processed first before a set of tokenization requests in a default priority category.

In some examples, the request sources 102-104 subscribe to request categories of the stream brokers 114-116 that are source-specific. When the tokenization processing is complete, the tokens associated with the received tokenization requests are published to the tokenization stream brokers 114-116 in association with the source-specific request categories of the tokenization requests. In this way, each request source 102-104 is enabled to access published tokens for the set of tokenization requests that they sent. Further, other sources or entities may be prevented from subscribing to a source-specific request category and/or accessing tokens that are published in such a category, enhancing the security of the tokens as they are provided to the appropriate sources.

The request data store 118 includes software, firmware, and/or hardware configured to store the tokenization requests as described herein. Further, the request handler 120 includes software, firmware, and/or hardware configured to manage the operations of the request data store 118 and/or perform other request handling operations as described herein. In some examples, the request handler 120 is configured to control the request data store 118, including accessing the tokenization requests from the tokenization stream brokers 114-116 and writing them to the request data store 118. Writing the tokenization requests to the request data store 118 may include arranging or organizing the tokenization requests in a different format and/or manner than the order in which they were previously queued in the brokers 114-116. The request data store 118 may be configured with a data architecture that emphasizes fast, high-performance inserts and updates and provides fast data analytics capabilities (e.g., Apache Kudu).

Further, the request handler 120 may be configured to manage the rate at which tokenization requests are consumed from the request stream layer 112 and associated brokers 114-116, the rate at which stored tokenization requests are processed, and/or the rates at which tokenization requests or associated information is provided to the issuers 108-110 as described below. For instance, the request handler 120 may include a service that retrieves a tokenization request or a set number of tokenization requests from the request stream layer 112 at a regular defined time interval and writes the retrieved tokenization request or requests to the request data store 118.

The request processing service 122 includes software, firmware, and/or hardware configured to process the tokenization requests stored on the request data store 118 as described herein. In some examples, processing the tokenization requests from the request data store 118 includes generating a token for each tokenization request and storing an association of the newly generated token and a PAN that is included in the tokenization request. Further, processing the tokenization requests includes sending the PANs and/or other data of the tokenization requests and any associated tokens to the issuers 108-110 with which the PANs are associated (e.g., a PAN is associated with an account issued by an issuer of the issuers 108 and a tokenization request that includes the PAN is sent to the issuer). The request processing service 122 is further configured to process the tokenization requests at a defined request processing rate and to send tokenization request information to the associated issuers at issuer tokenization rates (each issuer may have a unique issuer tokenization rate at which they are able to receive tokenization request information). Request processing rates and issuer tokenization rates are described in greater detail below with respect to FIG. 2.

Figure 2:
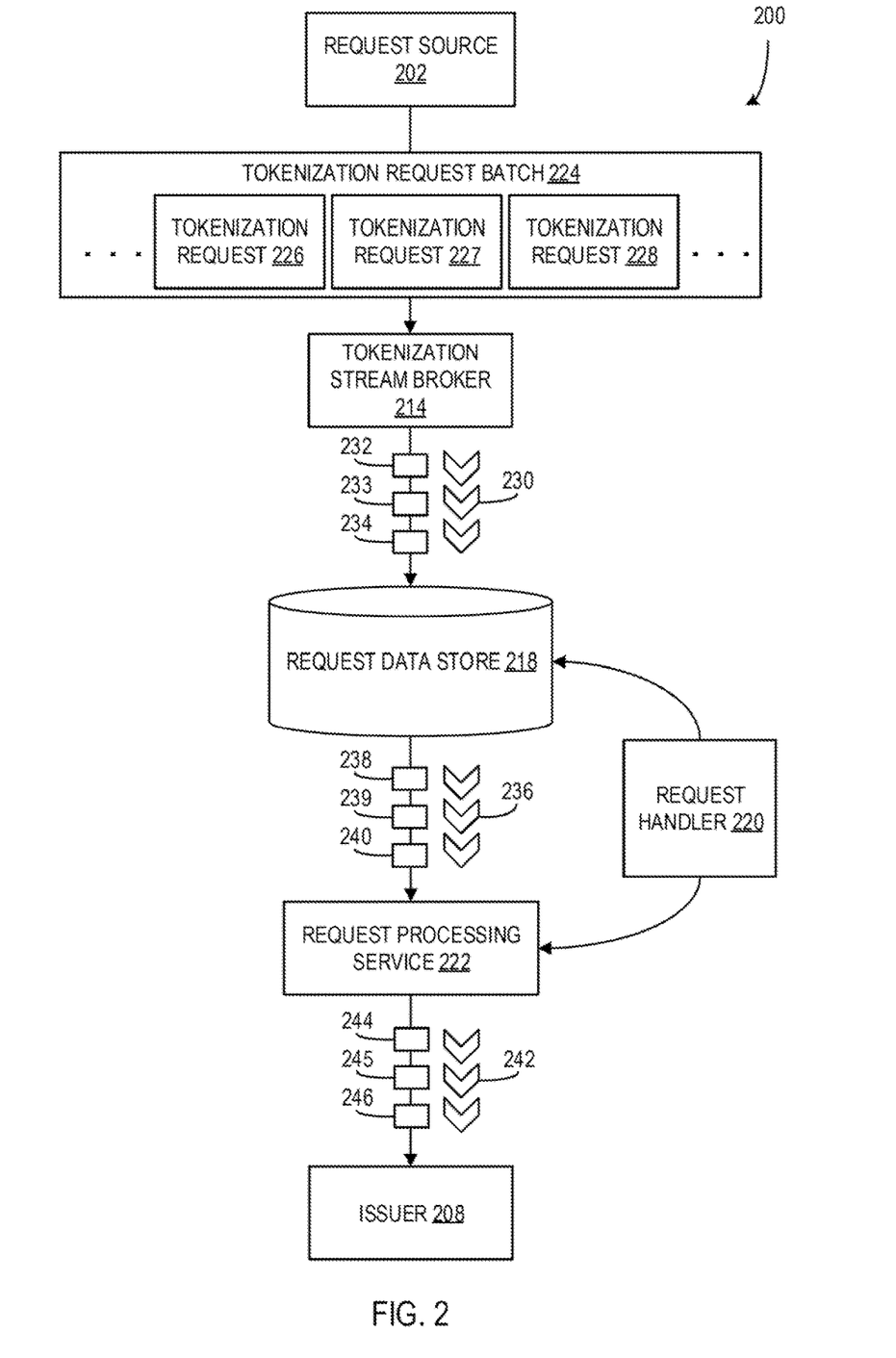
FIG. 2 is an exemplary block diagram illustrating a system configured for handling tokenization requests at throttled rates, including multiple dynamic processing rates, according to an embodiment.

FIG. 2 is an exemplary block diagram illustrating a system 200 configured for handling tokenization requests (e.g., tokenization requests 226, 227, and 228) at throttled rates, including multiple dynamic processing rates (e.g., request storage rate 230, request processing rate 236, and/or issuer tokenization rate 242), according to an embodiment. The system 200 includes a request source 202 that sends tokenization requests to the tokenization stream broker 214. The tokenization requests are consumed from the tokenization stream broker 214 and stored in the request data store 218. Then, they are processed by the request processing service 222, including sending tokenization request information to the issuer 208. It should be understood that the system 200 may be configured to operate in a substantially similar manner to the system 100 described above with respect to FIG. 1.

Additionally, in system 200, the request source 202 sends a tokenization request batch 224 that includes tokenization requests 226, 227, and 228 to the tokenization stream broker 214. While only requests 226, 227, and 228 are illustrated, it should be understood that the tokenization request batch 224 may include more, fewer, or different tokenization requests without departing from the description herein. For instance, a tokenization request batch 224 from request source 202 may include thousands, tens of thousands, or even millions of tokenization requests if the request source 202 is a large online retail merchant. The tokenization requests of the tokenization request batch 224 may include large sets or ranges of PANs from many different accounts and customers and associated with many different transactions and/or issuers. The requests of the tokenization request batch 224 are fed into the tokenization stream broker 214 via a producer interface or input interface as described above. In some examples, the system 200 includes a plurality of stream brokers and a tokenization request batch 224 may be split among the stream brokers or otherwise provided to the stream brokers as necessary.

The request handler 220 is configured to control the flow of the tokenization requests from the tokenization stream broker 214, into the request data store 218, to the request processing service 222, and/or to the issuer 208. The request handler 220 may include software components that access the tokenization requests in the tokenization stream broker 214 via output interfaces and store the accessed tokenization requests on the request data store 218. The tokenization requests 232, 233, and 234 are illustrated as being transferred from the tokenization stream broker 214 to the request data store at a request storage rate 230.

The request storage rate 230 may be defined for the system 200 in the request handler 220 and it may be based on the capabilities or limitations of the tokenization stream broker 214 and any other stream brokers that are part of the system and/or the capabilities or limitations of the request data store 218. For instance, the request data store 218 may have a limitation on the bandwidth of data it is capable of storing and the request storage rate 230 may be defined as at or below that bandwidth limitation. The rate 230 from a single tokenization stream broker 214 may also be based on the total number of stream brokers that are providing tokenization requests from storage on the request data store 218. For instance, if the request data store 218 is capable of storing 1000 tokenization requests per second and there are ten stream brokers that are configured to provide tokenization requests to the request data store, the request storage rate 230 for each tokenization stream broker may be defined as 100 tokenization requests per second. Alternatively, or additionally, the tokenization stream broker 214 may also have an effective bandwidth limitation. In that case, the request storage rate 230 may be based on that stream broker 214 bandwidth limitation as well.

In some examples, the request handler 220 is configured to dynamically adjust or throttle the request storage rate 230 for the tokenization stream broker 214 and/or request data store 218. For instance, in an example where the system 200 instantiates several new stream brokers to handle an increased rate of received tokenization requests from request sources, the request handler 220 is configured to throttle the request storage rate 230 for the tokenization stream broker 214 and other stream brokers down to ensure that the total bandwidth of requests being transferred to the request data store 218 does not exceed the effective limitations of the request data store.

The request handler 220 is further configured to control the transfer of the tokenization requests from the request data store 218 to the request processing service 222 for tokenization processing. As illustrated, the tokenization requests 238, 239, and 240 are transferred from the request data store 218 to the request processing service at a request processing rate 236. The request processing service 222 is configured to perform tokenization operations on the tokenization requests as described above, and the request processing rate 236 that is set and/or enforced by the request handler 220 may be based on the rate at which the request processing service 222 can effectively perform those tokenization operations. For instance, if the request processing service 222 is configured to generate a token based on the PAN in a tokenization request and then send the generated token and PAN to the associated issuer and the request processing service 222 is capable of performing these operations at a rate of 100 tokenization requests per second, the request processing rate 236 may be set defined to transfer 100 tokenization requests per second to the request processing service 222 from the request data store 218.

Further, in some examples, the request handler 220 is configured to dynamically adjust or throttle the request processing rate 236 similar to how the request storage rate 230 is adjusted above. For instance, the request processing rate 236 may have a default value that is less than the total processing capability of the request processing service 222 and, upon detecting a significant increase in the number of tokenization requests to be processed, the request handler 220 may adjust the request processing rate 236 upward toward the maximum processing rate of the request processing service 222 to improve the rate at which the newly received tokenization requests are processed.

Additionally, the request handler 220 and/or the request processing service 222 may be configured to control the transfer of tokenization requests or data associated with the tokenization requests (e.g., PANs and/or generated tokens) to the issuers associated with the tokenization requests. The tokenization requests 244, 245, and 246 are illustrated as being transferred to the issuer 208 from the request processing service 222 at an issuer tokenization rate 242. The issuer tokenization rate 242 may be based on the limitations or capabilities of the request processing service 222 to perform the tokenization operations described herein and/or the limitations or capabilities of each individual issuer to which the tokenization requests are being sent. For instance, in an example where the issuer 208 is capable of effectively receiving and processing 100 tokenization requests per second, the issuer 208 shares this limitation with other components of the system 200 (e.g., a payment network with which the request processing service 222 is associated) and the request handler 220 then sets the issuer tokenization rate 242 for the issuer 208 specifically to be equal to or less than 100 tokenization requests per second.

It should be understood that, while only one issuer is illustrated in system 200, in other examples, more and/or different issuers may receive tokenization requests from the request processing service 222 without departing from the description herein. Further, each issuer may have a unique issuer tokenization rate at which they are capable of or desire to receive tokenization requests (e.g., a large bank may be capable of significant tokenization request bandwidth, while a smaller credit union may have more significant limitations with respect to how quickly they can process tokenization requests). The request handler 220 and/or the request processing service 222 maintain a database or other data structure in which the issuer tokenization rates are stored for each issuer and those rates are used by the request handler 220 and/or request processing service 222 when determining how quickly to process and send tokenization requests as described herein.

In some further examples, based on the differing issuer tokenization rates for the various issuers associated with the tokenization requests being processed through the system 200, the request processing service 222 is configured to select the order in which tokenization requests stored in the request data store 218 are processed. For instance, if issuer 208 has an issuer tokenization rate 242 of 100 tokenization requests per second, the request processing service 222 is configured to only select tokenization requests associated with the issuer 208 for processing at that issuer tokenization rate 242 or less. Any extra processing bandwidth that the request processing service 222 has may be used to process tokenization requests associated with other issuers.

The system 200 may further include stream broker layers that behave like the request stream layer 112 and that are configured to buffer or queue tokenization requests being transferred between the request data store 218 the request processing service 222 and/or between the request processing service 222 and the issuer 208. Such additional stream broker layers may receive and provide tokenization requests in a substantially similar manner as the tokenization stream broker 214 and tokenization stream brokers 114-116 described above. These stream broker layers may provide the system 200 further flexibility with respect to the rates at which the tokenization requests are accessed or consumed by various components of the system 200 (e.g., the request processing service 222 may send processed tokenization requests or associated information to a stream broker layer at a different rate than the issuer 208 consumes the same information from the stream broker layer).

Figure 3:
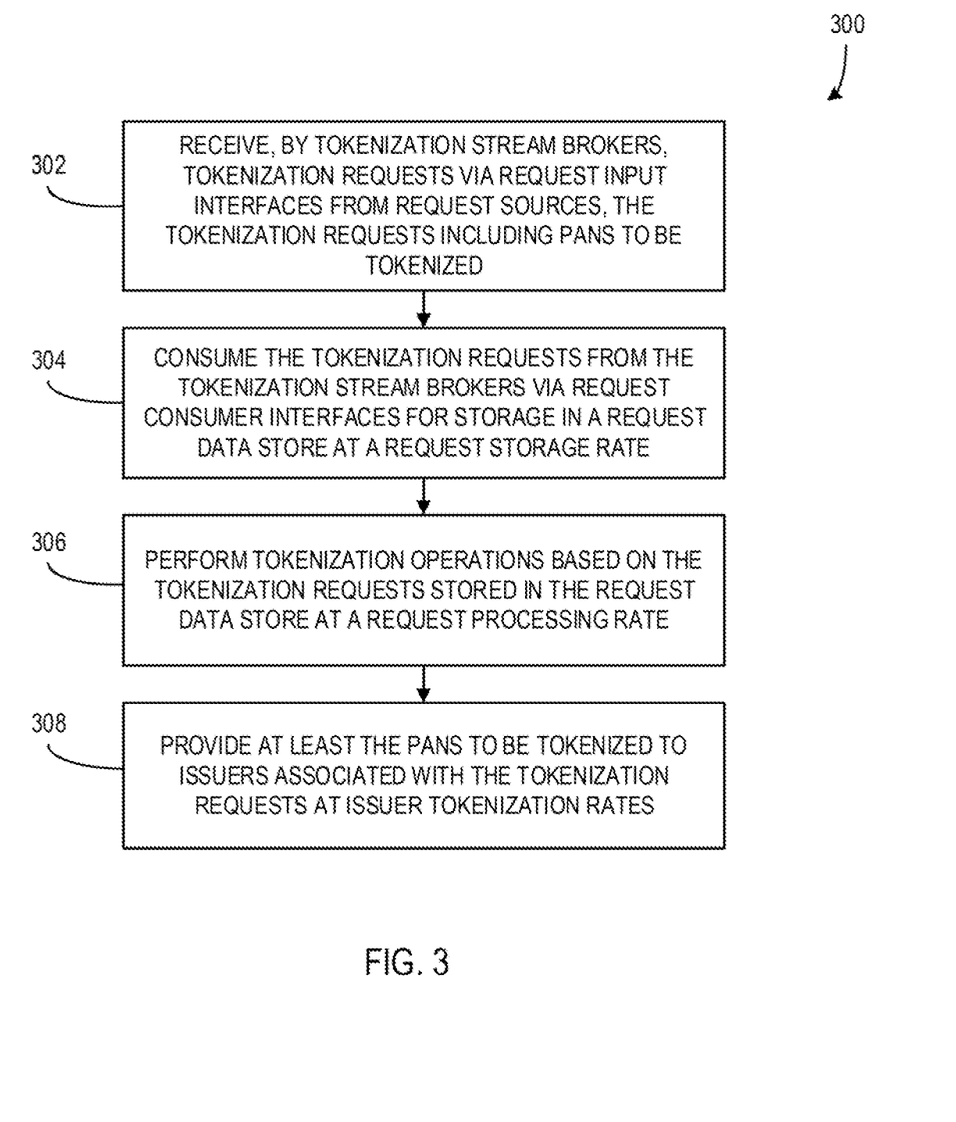
FIG. 3 is an exemplary flow chart illustrating a method of handling tokenization requests at a payment network at a throttled rate according to an embodiment.

FIG. 3 is an exemplary flow chart illustrating a method 300 of handling tokenization requests at a payment network at a throttled rate according to an embodiment. It should be understood that the method 300 as described may be implemented and/or executed by one or more components of a system such as systems 100 and 200 described above with respect to FIGS. 1 and 2. At 302, tokenization requests are received by tokenization stream brokers via request input interfaces from request sources. The received tokenization requests include PANs to be tokenized. In further examples, receiving the tokenization requests includes buffering or queueing the tokenization requests in the tokenization stream brokers as described herein. The tokenization requests may further include information about associated transactions, such as types of transactions or priority of transactions (e.g., transactions that are occurring immediately may be higher priority than transactions scheduled for the future). Queueing the tokenization requests in the tokenization stream brokers may include associating the requests with categories, such as request source-specific categories or categories based on the included transaction information.

At 304, the tokenization requests are consumed from the tokenization stream brokers via request consumer interfaces for storage in a request data store at a request storage rate. Consumption and storage of the tokenization requests may further include storing the tokenization requests in a defined order or arrangement in a data structure based on the information included in the tokenization requests and/or based on any categories with which the tokenization requests are associated in the tokenization stream brokers. Such category associations may further be stored in the request data store with the tokenization requests (e.g., the request source and/or priority of a tokenization request may be stored with the tokenization request in the request data store).

At 306, tokenization operations are performed based on the tokenization requests stored in the request data store at a request processing rate. The tokenization operations may be performed by a request processing service (e.g., request processing service 122 or 222) as described herein. In some examples, the tokenization operations include generating a token for each tokenization request based on the PAN or other information included in the tokenization request. Tokens may be generated using any known token generation algorithm as would be understood by a person of ordinary skill in the art. The tokenization operations may be performed on tokenization requests in an order and/or at a rate based on categories with which the tokenization requests are associated and/or based on the arrangement of the tokenization requests in the request data store. Additionally, or alternatively, the tokenization requests may be processed in an order based on the chronological order in which the tokenization requests are received from the request sources.

At 308, at least the PANs are provided to issuers associated with the tokenization requests at issuer tokenization rates. In some examples, providing the PANs to the associated issuers includes sorting the tokenization requests being processed by associated issuers and sending each issuer the appropriate set of PANs and/or other tokenization request information, including the associated tokens if they have been generated. Tokens generated in this manner may then be provided back to a request processing service or other component of the system to provide the tokens to the request sources in response to the tokenization requests.

Figure 4:
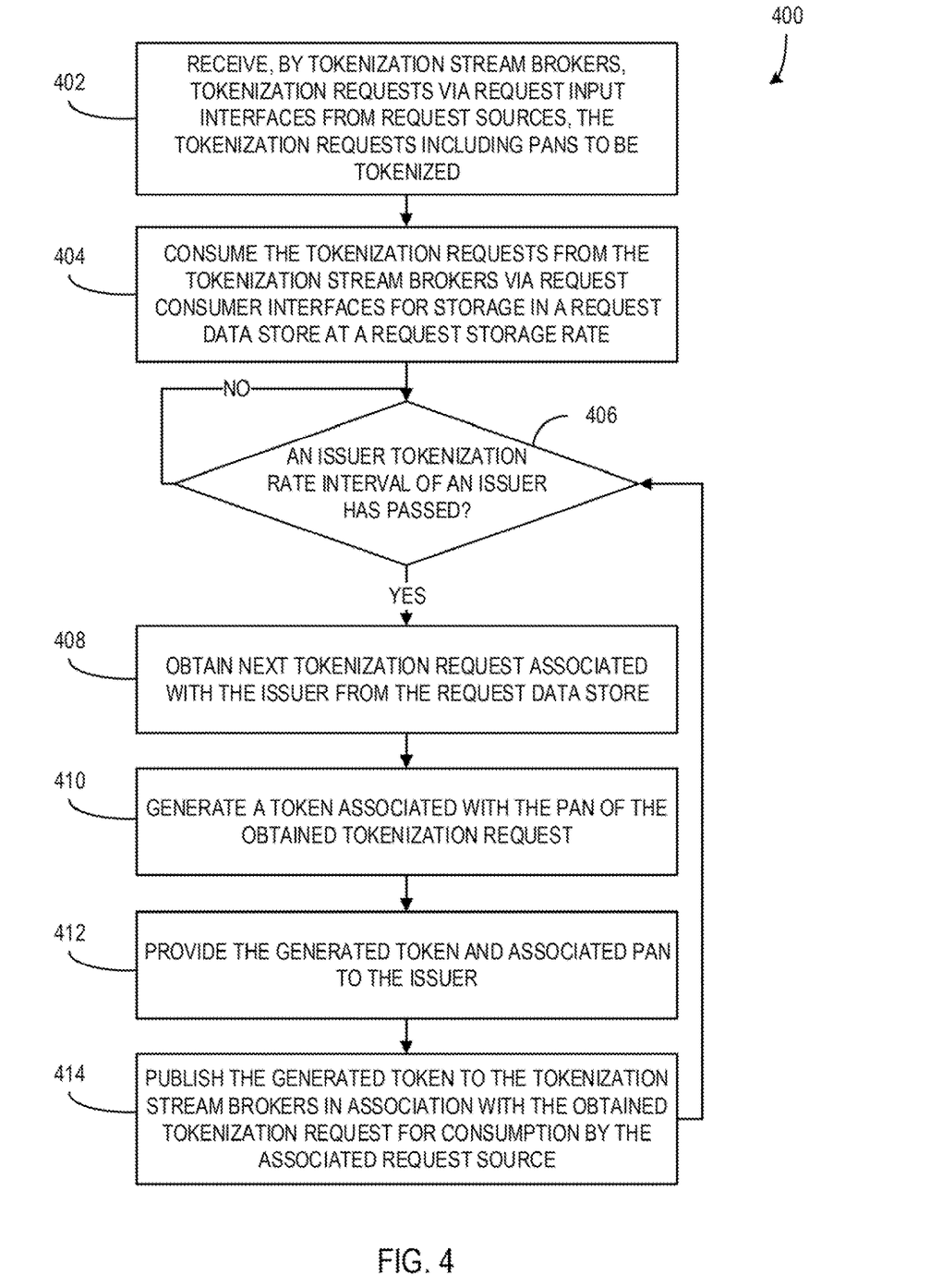
FIG. 4 is an exemplary flow chart illustrating a method of handling tokenization requests, including generating and providing tokens to an issuer at an issuer tokenization rate according to an embodiment.

FIG. 4 is an exemplary flow chart illustrating a method 400 of handling tokenization requests, including generating and providing tokens to an issuer at an issuer tokenization rate according to an embodiment. It should be understood that the method 400 as described may be implemented and/or executed by one or more components of a system such as systems 100 and 200 described above with respect to FIGS. 1 and 2. At 402 and 404, tokenization requests are received by tokenization stream brokers and then consumed in substantially the same manner as at 302 and 304 described above with respect to FIG. 3.

At 406, if an issuer tokenization rate interval of an issuer has passed, the process proceeds to 408. Alternatively, if an issuer tokenization rate interval of an issuer has not passed, the process loops back to check again at 406. The issuer tokenization rate interval is a time interval based on a defined issuer tokenization rate as described above. The interval represents the time required by the issuer to process or otherwise handle a tokenization request or associated information. For instance, if an issuer has an issuer tokenization rate of 60 tokenization requests per minute, the issuer tokenization rate interval of the issuer is 1 second (60 tokenization requests divided by 60 seconds equals 1 second).

In some examples, the check of 406 is performed for each issuer for which the system performing the method 400 has stored tokenization requests in the request data store. Further, the passage of issuer tokenization rate intervals may be monitored for each issuer in parallel, such that, when the method 400 proceeds to 408 for a first issuer, the system may include one or more parallel processes that continue performing the interval check of 406 for other issuers. The determination that the issuer tokenization rate interval of an issuer has passed also causes a timer or other time-based component used to track the interval to be reset, such that the passage of subsequent issuer tokenization rate intervals is identified at 406 for that issuer.

At 408, the next tokenization request associated with the issuer is obtained from the request data store. This tokenization request may be obtained by a request processing service (e.g., request processing services 122 or 222) as described above. In some examples, obtaining the next tokenization request includes obtaining the next tokenization request of the issuer in chronological order that it was received and then stored in the request data store. Alternatively, or additionally, determining the next tokenization request to obtain and process may be based on categories of the tokenization request, such as type or priority, as described herein. At 410, a token associated with the PAN of the obtained tokenization request is generated. The token may be generated according to any known token generation algorithm as would be understood by a person of ordinary skill in the art.

At 412, the generated token and associated PAN are provided to the issuer. In some examples, providing the generated token and PAN to the issuer includes communicating the generated token and PAN over a network to the issuer via a network portal or other interface provided by the issuer. In alternative examples, providing the generated token and PAN to the issuer includes publishing the token and PAN to a data stream layer with stream brokers that behaves in a similar manner to the request stream layer 112 described above with respect to FIG. 1. In this case, the issuer is enabled to access the published token and PAN when able, and the data stream layer buffers or queues the published token and PAN information at least until they have been consumed by the associated issuer.

At 414, the generated token is published to the tokenization stream brokers in association with the obtained tokenization request for consumption by the associated request source. In some examples, publishing the generated token to the tokenization stream brokers includes publishing the generated token in association with a stream category that is associated with the source of the tokenization request (e.g., a token generated from a tokenization request from an online retail merchant is published to a category associated with that online retail merchant). Such source-specific stream categories limit access to the tokens to only the specific request source, such that no other entities are able to access tokens generated for a particular source and published in that source's specific category.

After 414, the process returns to 406 to continue checking for the passage of issuer tokenization rate intervals of issuers as described above. The method 400 may continue to perform the described steps as long as there are tokenization requests in the request data store. It should further be understood that, once a token has been generated and published in response to a tokenization request, that tokenization request may be removed from the request data store, flagged for later removal, or otherwise flagged as complete, indicating that the system no longer needs to process the tokenization request.

Additional Example Scenarios

Aspects of the disclosure enable various additional scenarios, such as next described.

In an example, an online retail merchant accesses input interfaces of a plurality of tokenization stream brokers of a payment network and provides a batch of tokenization requests to those tokenization stream brokers. The batch of tokenization requests are buffered in the tokenization stream brokers and associated with a request category that is defined for the online retail merchant. The batch of tokenization requests are provided to ten tokenization stream brokers in parallel to account for the substantial influx of tokenization requests. Further, the tokenization requests received by the ten primary tokenization stream brokers are then shared with two backup tokenization stream brokers for each primary stream broker to create a redundant buffer of requests that is secure against the failure of the primary tokenization stream brokers.

Upon receiving the batch of tokenization requests, a request handler of the payment network begins to consume the buffered tokenization requests in the stream brokers and write them to a request data store. The request handler consumes the tokenization requests in chronological order from the ten primary stream brokers and stores them on the request data store in an organization that includes an issuer identity associated with each tokenization request. The request handler consumes the tokenization requests at a request storage rate that is defined for the request data store, including consuming tokenization requests from each of the ten primary stream brokers at a $\frac{1}{10}^{th}$ fraction of the total request storage rate, such that the consumption of requests from all the stream brokers adds up to the total request storage rate.

As the batch of tokenization requests are consumed and stored, a request processing service of the payment network begins to process the stored tokenization requests. The request processing service accesses the request data store and obtains requests at a request processing rate associated with the service. Further, the request processing service obtains requests associated with issuers that are ready to receive tokenization request information based on the stored issuer tokenization rates associated with those issuers. So, the request processing service obtains the next tokenization request with a first bank as an issuer. The first bank has an issuer tokenization rate of 60 requests per minute, so the request processing service will not obtain the next tokenization for the first bank until a second has passed.

Upon obtaining a tokenization request, the request processing service applies a token generation algorithm to the PAN of the tokenization request, generating an associated token. The PAN, token, and other tokenization request information are then sent to the issuer associated with the tokenization request. Further, the request processing service then publishes the generated token and its association to the PAN to the tokenization stream brokers to the category of the online retail merchant. The online retail merchant then accesses the published token and PAN and stores the token for use in transactions with the account of the PAN.

Exemplary Operating Environment

Figure 5:
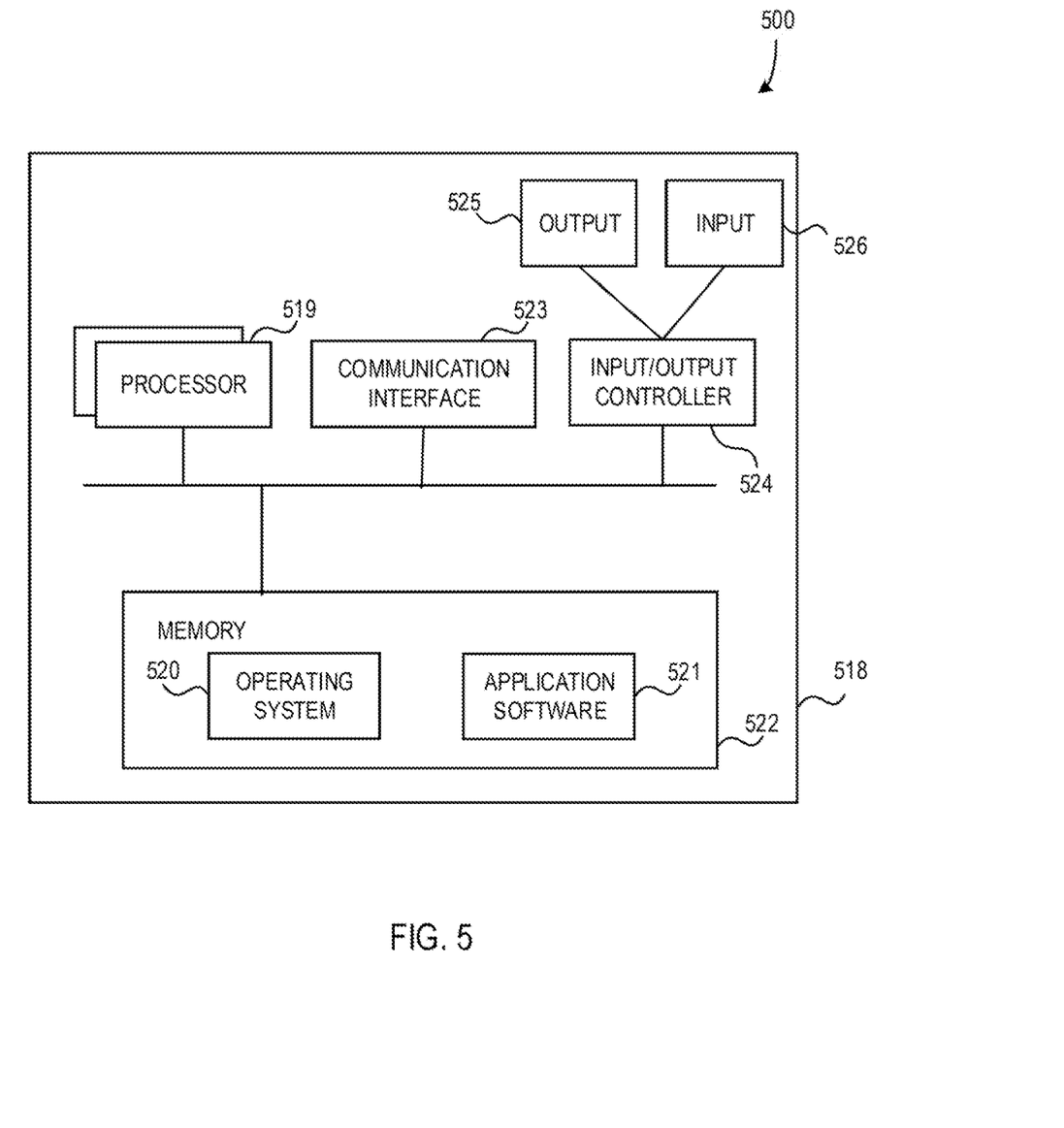
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Alternatively, or in addition, the processor 519 is any technology capable of executing logic or instructions, such as a hardcoded machine. Platform software comprising an operating system 520 or any other suitable platform software may be provided on the apparatus 518 to enable application software 521 to be executed on the device. According to an embodiment, handling tokenization requests to a payment network at a throttled processing rate as described herein may be accomplished by software, hardware, and/or firmware.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor; and at least one memory comprising computer program code, the at least one memory and the computer program code configured to, with the at least one processor, implement one or more tokenization stream brokers in a tokenization request stream layer and to cause the at least one processor to: receive, by the one or more tokenization stream brokers in a request stream layer, tokenization requests via tokenization request input interfaces from one or more request sources, the tokenization requests including primary account numbers to be tokenized; consume the tokenization requests from the one or more tokenization stream brokers via request consumer interfaces for storage in a request data store at a request storage rate; and perform tokenization operations based on the tokenization requests stored in the request data store at a request processing rate, wherein the tokenization operations include providing at least the primary account numbers to be tokenized to one or more issuers associated with the tokenization requests at issuer tokenization rates associated with the one or more issuers, whereby the request processing rate is throttled for compatibility with capabilities of the system and the one or more issuers.

A computerized method for handling tokenization requests associated with electronic transactions at a payment network at a throttled processing rate comprises: receiving by one or more tokenization stream brokers in a request stream layer, tokenization requests via tokenization request input interfaces from one or more request sources, the tokenization requests including primary account numbers to be tokenized; consuming, by a request handler, the tokenization requests from the one or more tokenization stream brokers via request consumer interfaces for storage in a request data store at a request storage rate; and performing, by a request processing service, tokenization operations based on the tokenization requests stored in the request data store at a request processing rate, wherein the tokenization operations include providing at least the primary account numbers to be tokenized to one or more issuers associated with the tokenization requests at issuer tokenization rates associated with the one or more issuers, whereby the request processing rate is throttled for compatibility with capabilities of the request processing service and the one or more issuers.

One or more exemplary non-transitory computer readable storage media comprises computer-executable instructions for handling tokenization requests associated with electronic transactions at a payment network at a throttled processing rate that, upon execution by a processor, cause the processor to at least: receive, by one or more tokenization stream brokers in a request stream layer, tokenization requests via tokenization request input interfaces from one or more request sources, the tokenization requests including primary account numbers to be tokenized; consume, by a request handler, the tokenization requests from the one or more tokenization stream brokers via request consumer interfaces for storage in a request data store at a request storage rate; and perform, by a request processing service, tokenization operations based on the tokenization requests stored in the request data store at a request processing rate, wherein the tokenization operations include providing at least the primary account numbers to be tokenized to one or more issuers associated with the tokenization requests at issuer tokenization rates associated with the one or more issuers, whereby the request processing rate is throttled for compatibility with capabilities of the request processing service and the one or more issuers.

Alternatively, or in addition to the other examples described herein, examples include any combination of the following:

wherein performing tokenization operations includes: generating tokens associated with the primary account numbers of the tokenization requests; providing the generated tokens and associated primary account numbers to issuers associated with the primary account numbers of the one or more issuers; and publishing the generated tokens to the one or more tokenization stream brokers, wherein access to the tokens is provided to the one or more request sources.

wherein receiving the tokenization requests includes receiving a subscription, from each request source of the one or more request sources, to a stream category associated the request source; and wherein publishing the generated tokens to the one or more tokenization stream brokers includes publishing each token of the generated tokens to the stream category associated with the request source from which the associated tokenization request was received.

wherein generating tokens associated with the primary account numbers of the tokenization requests further includes: generating a first set of tokens from a first set of primary account numbers associated with a first issuer of the one or more issuers at a first issuer tokenization rate; based on the generation of each token of the first set of tokens, providing the generated token and an associated primary account number of the first set of primary account numbers to the first issuer; generating a second set of tokens from a second set of primary account numbers associated with a second issuer of the one or more issuers at a second issuer tokenization rate in parallel with generating the first set of tokens; based on the generation of each token of the second set of tokens, providing the generated token and an associated primary account number of the second set of primary account numbers to the second issuer; wherein a combination of the first issuer tokenization rate and the second issuer tokenization rate is less than or equal to the request processing rate.

wherein the at least one memory and the computer program code is configured to, with the at least one processor, further cause the at least one processor to: publish the stored tokenization requests from the tokenization request data store to one or more data store stream brokers, wherein performing the tokenization operations includes consuming the published plurality of tokenization requests from the one or more data store stream brokers at the request processing rate.

wherein the at least one memory and the computer program code is configured to, with the at least one processor, further cause the at least one processor to instantiate additional tokenization stream brokers in the request stream layer based on detecting an increased rate of receiving tokenization requests.

wherein receiving the tokenization requests by the one or more stream brokers includes storing the received tokenization requests redundantly on at least two stream brokers for later consumption.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving, by the one or more tokenization stream brokers in a request stream layer, tokenization requests via tokenization request input interfaces from one or more request sources, the tokenization requests including primary account numbers to be tokenized; exemplary means for consuming the tokenization requests from the one or more tokenization stream brokers via request consumer interfaces for storage in a request data store at a request storage rate; and exemplary means for performing tokenization operations based on the tokenization requests stored in the request data store at a request processing rate, wherein the tokenization operations include providing at least the primary account numbers to be tokenized to one or more issuers associated with the tokenization requests at issuer tokenization rates associated with the one or more issuers, whereby the request processing rate is throttled for compatibility with capabilities of the system and the one or more issuers.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for processing a tokenization request associated with an electronic transaction, the system comprising:
a payment network comprising: a tokenization stream broker comprising a tokenization request input interface exposed to a request source, the request source comprising an entity, the entity configured to accept payment information from a customer as part of a transaction, and the payment information comprising a primary account number (PAN);
a processor communicatively coupled to the tokenization stream broker; and
a memory comprising computer program code, the memory and the computer program code configured to, with the processor:
receive, by the tokenization stream broker, the tokenization request via the tokenization request input interface from the request source, the tokenization request associated with the request source and comprising the PAN to be tokenized;
buffer, by the tokenization stream broker, the tokenization request;
consume, by a request handler, the tokenization request from the tokenization stream broker via a request consumer interface for storage in a request data store at a request storage rate, the request storage rate being based on one or more of the following: capabilities of the tokenization stream broker and capabilities of the request data store;
perform a tokenization operation via a request processing service, wherein performing comprises generating a token based on the tokenization request stored in the request data store at a request processing rate, the request processing rate being based on at least a rate at which the processor performs the tokenization operation;
provide at least the PAN to an issuer associated with the tokenization request at an issuer tokenization rate, the issuer tokenization rate being associated with the issuer and based on one or more of the following: capabilities of the system to perform the tokenization operation and capabilities of the issuer to receive the generated token;
define a throttled processing rate, the throttled processing rate not exceeding a slowest rate among a set comprising the request storage rate, the request processing rate, and the issuer tokenization rate, at least one of the rates in the set having a first value different from at least a second value of at least one other rate in the set; and
send, via at least the tokenization stream broker, the generated token to the request source in accordance with the throttled processing rate.

2. The system of claim 1, wherein performing the tokenization operation includes:
generating the token associated with the PAN of the tokenization request;
providing the generated token and the associated PAN to the issuer associated with the-PAN of the issuer; and
publishing the generated token to the tokenization stream broker, wherein access to the token is provided to the request source.

3. The system of claim 2, wherein receiving the tokenization request includes receiving a subscription, from the request source to a stream category associated with the request source; and
wherein publishing the generated token to the tokenization stream broker includes publishing the generated token to the stream category associated with the request source from which the associated tokenization request was received.

4. The system of claim 2, wherein generating the token associated with the PAN of the tokenization request further includes:

generating a first token from a first PAN associated with a first issuer at a first issuer tokenization rate;
based on the generation of the first token, providing the generated first token and the associated first PAN to the first issuer;
generating a second token from a second PAN associated with a second issuer at a second issuer tokenization rate in parallel with generating the first token;
based on the generation of the second token, providing the generated second token and the associated second PAN to the second issuer; and
wherein a combination of the first issuer tokenization rate and the second issuer tokenization rate is less than or equal the request processing rate.

5. The system of claim 1, wherein the memory and the computer program code is configured to, with the processor, further cause the processor to:
publish the tokenization request from the request data store to a data store stream broker, wherein performing the tokenization operation includes consuming the published tokenization request from the data store stream broker at the request processing rate.

6. The system of claim 1, wherein the memory and the computer program code is configured to, with the processor, further cause the processor to instantiate additional tokenization stream brokers based on detecting an increased rate of receiving tokenization requests.

7. The system of claim 1, wherein the tokenization stream broker is further configured to buffer the tokenization request in association with a request organization, the request organization comprising setting a priority of processing the tokenization request.

8. A computerized method for processing a tokenization request associated with an electronic transaction, the payment network comprising: a tokenization stream broker comprising a tokenization request input interface exposed to a request source, the request source comprising an entity, the entity configured to accept payment information from a customer as part of a transaction, and the payment information comprising a primary account number (PAN), the method comprising:
receiving, by the tokenization stream broker, the tokenization request via the tokenization request input interface from the request source, the tokenization request associated with the request source and comprising the PAN to be tokenized;
buffering, by the tokenization stream broker, the tokenization request;
consuming, by a request handler, the tokenization request from the tokenization stream broker via a request consumer interface for storage in a request data store at a request storage rate, the request storage rate being based on one or more of the following: capabilities of the tokenization stream broker and capabilities of the request data store;
performing, by a request processing service, a tokenization operation, wherein performing comprises generating a token based on the tokenization request stored in the request data store at a request processing rate, the request processing rate being based on at least a rate at which the request processing service performs the tokenization operation;
providing at least the PAN to an issuer associated with the tokenization request at issuer tokenization rate, the issuer tokenization rate being associated with the issuer and based on one or more of the following: capabilities of the request processing service to perform the tokenization operation and capabilities of the issuer to receive the generated token;
defining a throttled processing rate, the throttled processing rate not exceeding a slowest rate among a set comprising the request storage rate, the request processing rate, and the issuer tokenization rate, at least one of the rates in the set having a first value different from at least a second value of at least one other rate in the set; and
sending, via at least the tokenization stream broker, the generated token to the request source in accordance with the throttled processing rate.

9. The computerized method of claim 8, wherein performing the tokenization operation includes:
generating the token associated with the PAN of the tokenization request;
providing the generated token and the associated PAN to the issuer associated with the-PAN of the issuer; and
publishing the generated token to the tokenization stream broker, wherein access to the token is provided to the request source.

10. The computerized method of claim 9, wherein receiving the tokenization request includes receiving a subscription from the request source to a stream category associated with the request source; and
wherein publishing the generated token to the tokenization stream broker includes publishing the generated token to the stream category associated with the request source from which the associated tokenization request was received.

11. The computerized method of claim 9, wherein generating token associated with the PAN of the tokenization request further includes:
generating a first token from a first PAN associated with a first issuer at a first issuer tokenization rate;
based on the generation of the first tokens, providing the generated token and the associated first PAN to the first issuer;
generating a second token from a second PAN associated with a second issuer at a second issuer tokenization rate in parallel with generating the first token;
based on the generation of the second token, providing the generated second token and the associated second PAN to the second issuer; and
wherein a combination of the first issuer tokenization rate and the second issuer tokenization rate less than or equal to the request processing rate.

12. The computerized method of claim 8, further comprising:
publishing the tokenization request from the request data store to a data store stream broker, wherein performing the tokenization operation includes consuming the published tokenization request from the data store stream broker at the request processing rate.

13. The computerized method of claim 8, further comprising instantiating additional tokenization stream brokers based on detecting an increased rate of receiving tokenization requests.

14. The computerized method of claim 8, wherein receiving the tokenization request by the tokenization stream broker includes storing the received tokenization request redundantly on the tokenization stream broker and at least one other tokenization stream broker for later consumption.

15. One or more non-transitory computer storage media having computer-executable instructions for processing a tokenization request associated with an electronic transaction at a payment network, the payment network comprising: a tokenization stream broker comprising a tokenization request input interface exposed to a request source, the request source comprising an entity, the entity configured to accept payment information from a customer as part of a transaction, and the payment information comprising a primary account number (PAN), that, upon execution by a processor, cause the processor to at least:
receive, by the tokenization stream broker, the tokenization request via the tokenization request input interface from the request source, the tokenization request associated with the request source and comprising the PAN to be tokenized;
buffer, by the tokenization stream broker, the tokenization request;
consume, by a request handler, the tokenization request from the tokenization stream broker via a request consumer interface for storage in a request data store at a request storage rate, the request storage rate being based on one or more of the following: capabilities of the tokenization stream broker and capabilities of the request data store;
perform, by a request processing service, a tokenization operation, wherein performing comprises generating a token based on the tokenization request stored in the request data store at a request processing rate, the request processing rate being based on at least a rate at which the processor performs the tokenization operation;
provide at least the PAN to an issuer associated with the tokenization request at an issuer tokenization rate, the issuer tokenization rate being associated with the issuer and based on one or more of the following: capabilities of the request processing service to perform the tokenization operation and capabilities of the issuer to receive the generated token;
define a throttled processing rate, the throttled processing rate not exceeding a slowest rate among a set comprising the request storage rate, the request processing rate, and the issuer tokenization rate, at least one of the rates in the set having a first value different from at least a second value of at least one other rate in the set; and
send, via at least the tokenization stream broker, the generated token to the request source in accordance with the throttled processing rate.

16. The one or more computer storage media of claim 15, wherein performing the tokenization operation includes:
generating the token associated with the PAN of the tokenization request;
providing the generated token and the associated PAN to the issuer associated with the-PAN of the issuers; and
publishing the generated token to the tokenization stream broker, wherein access to the token is provided to the request sources.

17. The one or more computer storage media of claim 16, wherein receiving the tokenization request includes receiving a subscription from the request source to a stream category associated with the request source; and
wherein publishing the generated tokens to the tokenization stream broker includes publishing the generated token to the stream category associated with the request source from which the associated tokenization request was received.

18. The one or more computer storage media of claim 16, wherein generating tokens associated with the PAN of the tokenization request further includes:

generating a first token from a first PAN associated with a first issuer at a first issuer tokenization rate;

based on the generation of the first token, providing the generated first token and the associated first PAN to the first issuer;

generating a second token from a second PAN associated with a second issuer at a second issuer tokenization rate in parallel with generating the first token;

based on the generation of the second token, providing the generated second token and the associated second PAN to the second issuer; and wherein a combination of the first issuer tokenization rate and the second issuer tokenization rate is less than or equal to the request processing rate.

19. The one or more computer storage media of claim 15, wherein the computer-executable instructions, upon execution by the processor, further cause the processor to at least:

publish the tokenization request from the request data store to a data store stream broker, wherein performing the tokenization operation includes consuming the published tokenization request from the data store stream broker at the request processing rate.

20. The one or more computer storage media of claim 15, wherein the computer-executable instructions, upon execution by the processor, further cause the processor to at least instantiate additional tokenization stream brokers based on detecting an increased rate of receiving tokenization requests.

* * * * *